(12) United States Patent
van Rietschote et al.

(10) Patent No.: US 7,203,944 B1
(45) Date of Patent: Apr. 10, 2007

(54) MIGRATING VIRTUAL MACHINES AMONG COMPUTER SYSTEMS TO BALANCE LOAD CAUSED BY VIRTUAL MACHINES

(75) Inventors: Hans F. van Rietschote, Sunnyvale, CA (US); Craig W. Hobbs, Mountain View, CA (US); Mahesh P. Saptarshi, Milpitas, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 304 days.

(21) Appl. No.: 10/616,437

(22) Filed: Jul. 9, 2003

(51) Int. Cl.
*G06F 9/46* (2006.01)
*G06F 9/455* (2006.01)

(52) U.S. Cl. .......................... 718/104; 718/1
(58) Field of Classification Search ................ 718/103, 718/104, 1
See application file for complete search history.

(56) References Cited

U.S. PATENT DOCUMENTS

| | | | |
|---|---|---|---|
| 4,912,628 A | 3/1990 | Briggs | |
| 4,969,092 A | 11/1990 | Shorter | |
| 5,257,386 A | 10/1993 | Saito | |
| 5,408,617 A | 4/1995 | Yoshida | |
| 5,621,912 A | 4/1997 | Borruso et al. | |
| 5,675,762 A * | 10/1997 | Bodin et al. | 711/206 |
| 5,852,724 A | 12/1998 | Glenn, II et al. | |
| 5,872,931 A | 2/1999 | Chivaluri | |
| 5,944,782 A | 8/1999 | Noble et al. | |
| 6,003,065 A | 12/1999 | Yan et al. | |
| 6,029,166 A | 2/2000 | Mutalik et al. | |
| 6,075,938 A | 6/2000 | Bugnion et al. | |
| 6,151,618 A | 11/2000 | Wahbe et al. | |
| 6,230,246 B1 | 5/2001 | Lee et al. | |
| 6,298,390 B1 | 10/2001 | Matena et al. | |
| 6,298,428 B1 | 10/2001 | Munroe et al. | |
| 6,324,627 B1 | 11/2001 | Kricheff et al. | |
| 6,341,329 B1 | 1/2002 | LeCrone et al. | |
| 6,363,462 B1 | 3/2002 | Bergsten | |
| 6,370,646 B1 | 4/2002 | Goodman et al. | |
| 6,421,739 B1 | 7/2002 | Holida | |
| 6,421,777 B1 | 7/2002 | Pierre-Louis et al. | |
| 6,438,642 B1 | 8/2002 | Shaath | |

(Continued)

OTHER PUBLICATIONS

Jacob Gorm Hansen and Asger Kahl Henriksen, Nomadic operating systems, Dec. 10, 2002.*

(Continued)

*Primary Examiner*—Meng-Al T. An
*Assistant Examiner*—Camquy Truong
(74) *Attorney, Agent, or Firm*—Lawrence J. Merkel; Meyertons, Hood, Kivlin, Kowert & Goetzel, P.c.

(57) ABSTRACT

A cluster comprises a plurality of computer systems, wherein each of the plurality of computer systems is configured to execute one or more virtual machines. Each of the plurality of computer systems comprises hardware and a plurality of instructions. The plurality of instructions, when executed on the hardware, migrates at least a first virtual machine executing on a first computer system of the plurality of computer systems to a second computer system of the plurality of computer systems. The plurality of instructions migrates the first virtual machine responsive to a first load of the first computer system prior to the migration exceeding a second load of the second computer system prior to the migration.

34 Claims, 5 Drawing Sheets

U.S. PATENT DOCUMENTS

| | | |
|---|---|---|
| 6,493,811 B1 | 12/2002 | Blades et al. |
| 6,542,909 B1 | 4/2003 | Tamer et al. |
| 6,578,064 B1 * | 6/2003 | Saito et al. ............... 718/103 |
| 6,694,346 B1 | 2/2004 | Aman et al. |
| 6,704,925 B1 | 3/2004 | Bugnion |
| 6,711,672 B1 | 3/2004 | Agesen |
| 6,718,538 B1 | 4/2004 | Mathiske |
| 6,725,289 B1 | 4/2004 | Waldspurger et al. |
| 6,735,601 B1 | 5/2004 | Subrahmanyam |
| 6,754,781 B2 | 6/2004 | Chauvel et al. |
| 6,757,778 B1 | 6/2004 | van Rietschote |
| 6,763,440 B1 | 7/2004 | Traversat et al. |
| 6,785,886 B1 | 8/2004 | Lim et al. |
| 6,789,103 B1 | 9/2004 | Kim et al. |
| 6,789,156 B1 | 9/2004 | Waldspurger |
| 6,795,966 B1 | 9/2004 | Lim et al. |
| 6,799,316 B1 | 9/2004 | Aguilar et al. |
| 6,802,062 B1 | 10/2004 | Oyamada et al. |
| 6,961,806 B1 | 11/2005 | Agesen et al. |
| 6,961,941 B1 | 11/2005 | Nelson et al. |
| 7,069,413 B1 | 6/2006 | Agesen et al. |
| 7,082,598 B1 | 7/2006 | Le et al. |
| 7,089,377 B1 | 8/2006 | Chen |
| 7,111,086 B1 | 9/2006 | Ecoleston et al. |
| 7,111,145 B1 | 9/2006 | Chen et al. |
| 7,111,481 B2 | 9/2006 | Green et al. |
| 2001/0016879 A1 | 8/2001 | Sekiguchi et al. |
| 2002/0049869 A1 | 4/2002 | Ohmura et al. |
| 2002/0099753 A1 | 7/2002 | Hardin et al. |
| 2002/0129078 A1 | 9/2002 | Plaxton et al. |
| 2003/0028861 A1 | 2/2003 | Wallman et al. |
| 2003/0033431 A1 | 2/2003 | Shinomiya |
| 2003/0097422 A1 | 5/2003 | Richards et al. |
| 2003/0126242 A1 | 7/2003 | Chang |
| 2004/0010787 A1 | 1/2004 | Traut et al. |
| 2004/0268340 A1 | 12/2004 | Steeb et al. |

OTHER PUBLICATIONS

Kinshuk Govil, Virtual clusers: Resoruce Mangement on Large Shared-Memory Multiprocessors, Oct. 200.*
Constantine P. Sapuntzakis et al., Optimizing the Migration of Virtual Computer, Feb. 12, 2003.*
Edouard Bugnion et al., Running Commodity Operating Systems on Scalable Multiprocessors.*
Sapuntzakis, et al., "Optimizing the Migration of Virtual Computers," Proceedings of the Fifth Symposium on Operating Systems Design and Implementation, Dec. 2002, 14 pages.
Helfrich, et al., "Internet Suspend/Resume," ISR Project Home Page, 2003, 4 pages.
Kozuch, et al., "Internet Suspend/Resume," IRP-TR-02-01, Apr. 2002, Accepted to the Fourth IEEE Workshop on Mobile Computing Systems and Applications, Callicoon, NY, Jun. 2002, Intel Research, 9 pages.
Kozuch, et al., "Efficient State Transfer for Internet Suspend/Resume," IRP-TR-02-03, May 2002, Intel Research, 13 pages.
Tolia, et al., "Using Content Addressing to Transfer Virtual Machine State," IRP-TR-02-11, Summer 2002, Intel Research, 11 pages.
Flinn, et al., "Data Staging on Untrusted Surrogates," IRP-TR-03-03, Mar. 2003, Intel Research, To Appear in the Proceedings of the 2nd USENIX Conference on File and Storage Technologies, San Francisco, 16 pages.
Tolia, et al., "Opportunistic Use of Content Addressable Storage for Distributed File Systems," IRP-TR-03-02, Jun. 2003, Intel Research, To Appear in the Proceedings of the 2003 USENIX Annual Technical Conference, San Antonio, TX, 16 pages.
VMware, Inc., "VMware Control Center," 2003, 3 pages.
InfoWorld, Robert McMillan, "VMware Launches VMware Control Center," 2003, 2 pages.
VMware, Inc., "VMware Control Center: Enterprise-class Software to Manage and Control Your Virtual Machines," 2003, 2 pages.
John Abbott, Enterprise Software, "VMware Heads Toward Utility Computing With New Dynamic Management Tools," Jul. 1, 2003, 4 pages.
Dejan S. Milogicic, et al., "Process Migration," Aug. 10, 1999, 49 pages.
Xian-He Sun, et al., "A Coordinated Approach for Process Migration in Heterogeneous Environments," 1999, 12 pages.
Kasidit Chanchio, et al., "Data Collection and Restoration for Heterogenous Process Migration," 1997, 6 pages.
Kasidit Chanchio, et al., "A Protocol Design of Communication State Transfer for Distributed Computing," Publication date unknown, 4 pages.
SourceForge™, "Project: openMosix: Document Manager: Display Document," 14 pages.
OpenMosix, "The openMosix HOWTO: LiveFree( ) or die ( )," May 7, 2003, 3 pages.
OpenMosix, "openMosix Documentation Wiki—don't," May 7, 2003, 2 pages.
Veritas, "Executive Overview," Technical Overview, pp. 1-9.
Kinshuk Govil, et al., "Cellular Disco: Resource Management Using Virtual Clusters on Shared-Memory Multiprocessors," 17th ACM Symposium on Operating Systems Principles (SOSP'99), Published as Operating Systems Review 34(5):154-169, Dec. 1999, pp. 154-169.
Edouard Bugnion, et al., "Disco: Running Commodity Operating Systems on Scalable Multiprocessors," Computer Systems Laboratoy, Stanford, CA, 33 pages.
"White Paper, GSX Server," VMware, Inc., Dec. 2000, pp. 1-9.
"Vmware GSX Serve, The Server Consolidation Solution," VMware, Inc., 2001, 2 pages.
"Manage Multiple Worlds., From Any Desktop," VMware, Inc., 2000, 2 pages.
"VMware ESX Server, The Server Consolidation Solution for High-Performance Environments," VMware, Inc., 2001, 2 pages.
Melinda Varian, "VM and the VM Community: Past, Present, and Future," Operating Systems, Computing and Information Technology, Princeton Univ., Aug. 1997, pp. 1-67.
VERITAS, "Comparison: Microsoft Logical Disk Manager and VERITAS Volume Manager for Windows," May 2001, 4 pages.
VERITAS, "How VERITAS Volume Manager Complements Hardware RAID in Microsoft Server Environments," May 2001, pp. 1-7.
VERITAS, "VERITAS Volume Manager for Windows, Best Practices," May 2001, pp. 1-7.
Barrie Sosinky, Ph.D., "The Business Value of Virtual Volume Management, In Microsoft Window NT and Windows 2000 Networks," VERITAS, A white paper for administrators and planners, Oct. 2001, pp. 1-12.
VERITAS, "VERITAS Volume Manager for Windows NT," Version 27, 2001, 4 pages.
"BladeFram™ System Overview," Egenera, Inc., 2001 2 pages.
White Paper, "The Egenera™ Processing Area Network (PAN) Architecture," Egenera, Inc., 2002, 20 pages.
White Paper, "Emerging Server Architectures," Egenera, Inc., 2001, 12 pages.
White Paper, "Improving Data Center Performance," Egenera, Inc., 2001, 19 pages.
White Paper, "Guidelines for Effective E-Business Infrastructure Management," Egenera, Inc., 2001, 11 pages.
White Paper, "The Pros and Cons of Server Clustering in the ASP Environment," Egenera, Inc., 2001, 10 pages.
Position Paper, "Taking Control of The Data Center," Egenera, Inc., 2001, 4 pages.
Position Paper, "The Linux Operating System: How Open Source Software Makes Better Hardware," Egenera, Inc., 2001, 2 pages.
"Solution Overview," TrueSAN Networks, Inc., 2002, 7 pages.
"Simics: A Full System Simulation Platform," Reprinted with permission from Computer, Feb. 2002, © The Institute of Electrical and Electronics Engineering, Inc., pp. 50-58.
"Introduction to Simics Full-System Simulator without Equal," Virtutech, Jul. 8, 2002, 29 pages.
"The Technology of Virtual Machines," A Conneectix White Paper, Connectix Corp., 2001, 13 pages.

"The Technology of Virtual PC," A Conneectix White Paper, Connectix Corp., 2000, 12 pages.

"About LindowsOS," Lindows.com, http://www.lindows.com/lindows_products_lindowsos.php, 2002, 2 pages.

"Savannah: This is a Savannah Admin Documentation," Savannah, Free Software Foundation, Inc.,© 2000-2002, 31 pages.

"Virtuozzo Basics," Virtuozzo, http://www.sw-soft.com/en/products/virtuozzo/basics/, © 1994-2002, SWsoft, printed from web on Dec. 13, 2002, 2 pages.

"What is Virtual Environmnet(VE)?," SWsoft, http://www.sw-soft/en/products/virtuozzo/we/, © 1994-2002 SWsoft, printed from web on Dec. 13, 2002, 2 pages.

"Products," Netraverse, Inc, 2002, http://www.netraverse.com/products/index.php, printed from web on Dec. 13, 2002, 1 page.

"NeTraverse Win4Lin 4.0—Workstation Edition," Netraverse, Inc., 2002, http://www.netraverse.com/products/win4lin40/, printed from web on Dec. 13, 2002, 1 page.

"Win4Lin Desktop 4.0," Netraverse, Inc., 2002, http://www.netraverse.com/products/win4lin40/benefits.php, printed from web on Dec. 13, 2002, 1 page.

"Win4Lin Desktop 4.0," Netraverse, Inc, 2002, http://www.netraverse.com/ products/win4lin40/features.php, printed from web on Dec. 13, 2002, 2 page.

"Win4Lin Terminal Server 2.0," Netraverse, Inc, 2002, http://www.netraverse.com/ products/win4lin40/requirements.php, printed from web on Dec. 13, 2002, 2 page.

"Win4Lin Terminal Server 2.0," Netraverse, Inc, 2002, http://www.netraverse.com/ products/wts, printed from web on Dec. 13, 2002, 1 page.

"Win4Lin Terminal Server 2.0," Netraverse, Inc, 2002, http://www.netraverse.com/ products/wts/benefits.php, printed from web on Dec. 13, 2002, 1 page.

Win4Lin Terminal Server 2.0, Netraverse, Inc, 2002, http://www.netraverse.com/ products/wts/features.php, printed from web on Dec. 13, 2002, 2 pages.

Win4Lin Terminal Server 2.0, Netraverse, Inc, 2002, http://www.netraverse.com/ products/wts/requirements.php, printed from web on Dec. 13, 2002, 2 pages.

Win4Lin Terminal Server 2.0, Netraverse, Inc, 2002, http://www.netraverse.com/ products/wts/technology.php, printed from web on Dec. 13, 2002, 1 page.

Win4Lin, Netraverse, Inc., 2002, http://www.netraverse.com/ support/docs/Win4Lin-whitepapers.php, printed from web on Dec. 13, 2002, 5 pages.

"Virtual PC for Windows," Connectix, Version 5.0, 2002, 2 pages.

Dave Gardner, et al., "WINE FAQ,", © David Gardner 1995-1998, printed from www.winehq.org, 13 pages.

"Winelib User's Guide," Winelib, www.winehq.org, 26 pages.

John R. Sheets, et al. "Wine User Guide," www.winehq.org, pp. 1-53.

"Wine Developer's Guide," pages, www.winehq.org, 1-104.

* cited by examiner

Load = $W_{CPU}$ * CPUTime + $W_{I/O}$ * I/O Activity + $W_{Mem}$ * Memory Pages

90

MIGRATING VIRTUAL MACHINES AMONG COMPUTER SYSTEMS TO BALANCE LOAD CAUSED BY VIRTUAL MACHINES

BACKGROUND OF THE INVENTION

1. Field of the Invention

This invention is related to the field of virtual machines and, more particularly, to balancing the load of virtual machines among the computer systems in a cluster.

2. Description of the Related Art

Virtual machines have a variety of uses in computer systems. For example, virtual machines may be used to provide several users with access to the computer system concurrently. Each user may execute applications in a different virtual machine, and the virtual machines may be scheduled for execution on the computer system hardware. Virtual machines can also be used during software development to test the software on various hardware configurations (e.g. each hardware configuration is represented by a differently configured virtual machine). Virtual machines may be used to consolidate tasks that were previously running on separate computer systems by assigning each task to a virtual machine and running the virtual machines on fewer computer systems. Virtual machines may also be used to provide high availability. If a given computer system fails, tasks that were executing in virtual machines on that computer system may be transferred ("failed over") to similar virtual machines on other computer systems. Moreover, the entire virtual machine may be failed over to another computer system. There may be many other uses for virtual machines as well.

Typically, virtual machines are manually assigned to computer systems by an administrator, based on an assumed load that each virtual machine will generate or based on measured loads under various circumstances. However, estimates of the load may be incorrect or the load may dynamically change during use, and thus less than optimal usage of the computer systems may result. In some cases, cluster-level performance monitoring tools may be used to monitor load and inform the administrator when load imbalances are detected. Complicated policy settings may be used to help balance the load.

Some operating systems have implemented process migration schemes to migrate processes being handled by the operating system. For example, Open MOSIX may be used with the Linux operating system to perform process migration. Typically, the process migration schemes are complicated by locating points in the process at which migration may occur. Additionally, oftentimes a process may share a memory segment or segments with other processes. Identifying which processes share memory segments, and which memory segments are shared, may be difficult. Accordingly, open MOSIX does not permit the migration of processes that share a memory segment. Newer versions of open MOSIX may permit some migration of processes that share a single memory segment, by migrating the processes and the shared memory segment together to a single computer system.

Additionally, open MOSIX maintains a "stub" process for a migrated process on the computer system on which the migrated process was launched (the "home node"). The stub process is used by the migrated process for all I/O activity (since the I/O devices accessed by the process may be part of the home node or accessible to the home node but not to the computer system to which the process migrated). Additionally, the stub is used when the process requests the time of day, since the time of day facilities on the home node and the computer system to which the process migrated are not perfectly synchronized. Thus, once a process migrates, it actually has a presence on two computer systems. If either computer system goes down, the process may be lost, which lowers the availability of the process (in the "high availability" sense discussed with regard to enterprise computing systems).

SUMMARY OF THE INVENTION

In one embodiment, a cluster comprises a plurality of computer systems, wherein each of the plurality of computer systems is configured to execute one or more virtual machines. Each of the plurality of computer systems comprises hardware and a plurality of instructions. The plurality of instructions, when executed on the hardware, migrates at least a first virtual machine executing on a first computer system of the plurality of computer systems to a second computer system of the plurality of computer systems. The plurality of instructions migrates the first virtual machine responsive to a first load of the first computer system prior to the migration exceeding a second load of the second computer system prior to the migration.

BRIEF DESCRIPTION OF THE DRAWINGS

The following detailed description makes reference to the accompanying drawings, which are now briefly described.

Figure 1:
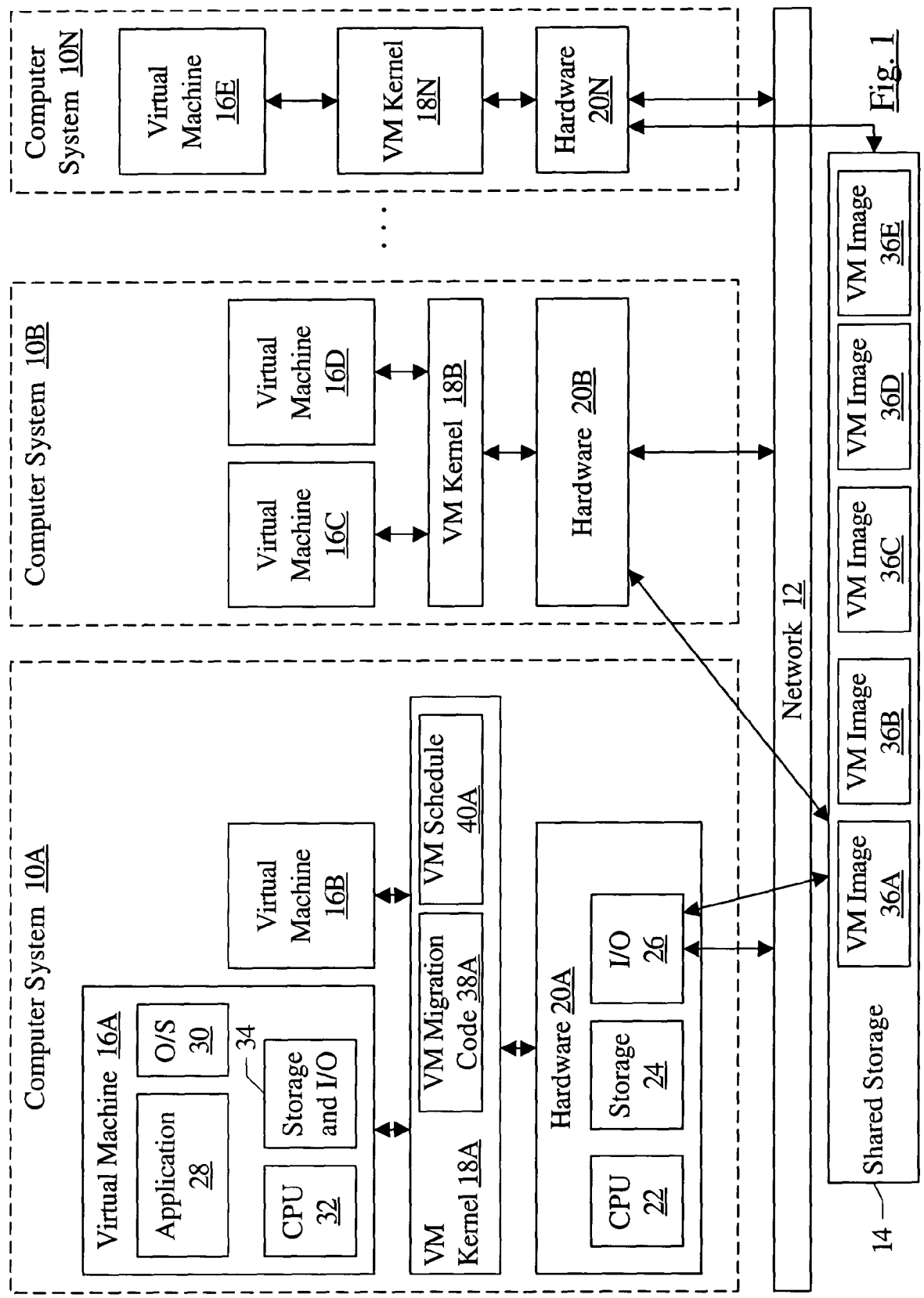
FIG. 1 is a block diagram of one embodiment of a cluster of computer systems configured to execute virtual machines.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram is shown illustrating one embodiment of a cluster of computer systems. In the embodiment of FIG. 1, the cluster includes computer systems 10A–10N, a network 12, and a shared storage device 14. The computer systems 10A–10N are each coupled to the network 12 and to the shared storage device 14. Each of the computer systems 10A–10N includes one or more virtual machines (e.g. virtual machines 16A–16B on the computer system 10A, virtual machines 16C–16D on the computer system 10B, and virtual machine 16E on the computer system 10N). The virtual machines are managed by a virtual machine (VM) kernel (e.g. kernels 18A, 18B, and 18N in the computer systems 10A, 10B, and 10N, respectively). The virtual machines 16A–16E and the VM kernels 18A–18N may comprise software and/or data structures. The software may be executed on the underlying hardware in the computer systems 10A–10N (e.g. the hardware 20A, 20B, and 20N in the computer systems 10A, 10B, and 10N). The hardware may include any desired circuitry. For example, the hardware 20A is shown to include a processor, or central processing unit (CPU) 22, a storage 24, and input/output (I/O) circuitry 26. In some embodiments, a computer system may include multiple CPUs 22. Similarly, a virtual machine may comprise multiple virtual CPUs, in some embodiments.

Generally, a virtual machine comprises any combination of software, one or more data structures in memory, and/or one or more files stored on the shared storage device 14. The virtual machine represents the software and hardware used during execution of a given application or applications. For example, in the virtual machine 16A, an application 28 is shown. The application 28 is designed to execute within the operating system (O/S) 30. Both the application 28 and the O/S 30 are coded with instructions executed by the virtual CPU 32. Additionally, the application 28 and/or the O/S 30 may make use of various virtual storage and virtual I/O devices 34. The virtual storage may represent any type of storage, such as memory, disk storage, tape storage, etc. The disk storage may be any type of disk (e.g. fixed disk, removable disk, compact disc read-only memory (CD-ROM), rewriteable or read/write CD, digital versatile disk (DVD) ROM, writeable or read/write DVD, etc.). The virtual I/O devices may include any type of I/O devices, including modems, audio devices, video devices, network interface cards (NICs), universal serial bus (USB) ports, firewire (IEEE 1394) ports, serial ports, parallel ports, etc. While one application 28 is shown in the virtual machine 16A, other embodiments may include multiple applications, if desired. Other virtual machines 16B–16E may be similar.

The virtual machine in which an application is executing may encompass the entire system state associated with an application. Generally, when a virtual machine is active (i.e. the application within the virtual machine is executing on the hardware 20A), the virtual machine may be stored in the memory of the computer system on which the virtual machine is executing (although the VM kernel may support a paging system in which various pages of the memory storing the virtual machine may be paged out to local storage in the computer system) and in the files on the shared storage device 14 which are mapped to the virtual storage devices in the virtual machine.

The virtual hardware in the virtual machine 16A (and other virtual machines such as virtual machines 16B–16E) may be similar to the hardware 20A included in the computer system 10A. For example, the virtual CPU 32 may implement the same instruction set architecture as the processor 22. In such cases, the virtual CPU 32 may comprise one or more data structures storing the processor state for the virtual machine 16A. The application and O/S software instructions may execute on the CPU 22 when the virtual machine 16A is scheduled for execution by the VM kernel 18A. When the VM kernel 18A schedules another virtual machine for execution (e.g. the virtual machine 16B), the VM kernel 18A may write the state of the CPU 22 into the virtual CPU 32 data structure. Alternatively, the virtual CPU 32 may be different from the CPU 22. For example, the virtual CPU 32 may comprise software coded using instructions from the instruction set supported by the CPU 22 to emulate instruction execution according to the instruction set architecture of the virtual CPU 32. Alternatively, the VM kernel 18A may emulate the operation of the hardware in the virtual machine. Similarly, other virtual hardware may be emulated in software if not included in the hardware 20A.

Different virtual machines which execute on the same computer system 10A may differ. For example, the O/S 30 included in each virtual machine may differ. Different virtual machines may employ different versions of the same O/S (e.g. Microsoft Windows NT with different service packs installed), different versions of the same O/S family (e.g. Microsoft Windows NT and Microsoft Windows2000), or different O/Ss (e.g. Microsoft Windows NT, Linux, Sun Solaris, etc.).

Generally, the VM kernel may comprise software which may schedule virtual machines for execution on the underlying hardware, using any scheduling scheme. For example, a time division multiplexed scheme may be used to assign time slots to each virtual machine. Generally, a given VM kernel 18A–18N may include a schedule comprising a plurality of entries (e.g. the VM schedule 40A shown in the VM kernel 18A in FIG. 1, and other VM kernels 18B–18N may similarly include schedules). Each entry may store an identification of one of the virtual machines assigned to the computer system, as well as any other desired information for scheduling virtual machines. The VM kernel may use the VM schedule to schedule virtual machines for execution. In one embodiment, the VM kernel may comprise the ESX product available from VMWare, Inc. (Palo Alto, Calif.). In another embodiment, the VM kernel may comprise the Virtual PC product available from Connectix Corporation (San Mateo, Calif.), now acquired by Microsoft Corp. The VM kernel may include a Java Virtual Machine, in some embodiments. It is noted that the VM kernel may also be referred to as a virtual machine monitor (VMM) such as the VMMs used on mainframe computer systems such as those available from International Business Machines Corporation. The VM kernel may also comprise "virtual servers" in which a computer system is partitioned into multiple virtual servers executing the same operating system and providing one or more applications for use by a user of that virtual server.

In the illustrated embodiment, the VM kernel may execute directly on the underlying hardware (i.e. without an underlying operating system). In other embodiments, the VM kernel may be designed to execute within an operating system. For example, the GSX product available from VMWare, Inc. may execute under various versions of Microsoft's Windows operating system and/or the Linux operating systems.

The VM kernels 18A–18N may include VM migration code (e.g. the VM kernel 18A is shown to include VM migration code 38A, and other VM kernels may include similar code, not shown in FIG. 1). The VM migration code may comprise software that, when executed, may migrate virtual machines between the computer systems 10A–10N, to balance the load on the computer systems 10A–10N. A virtual machine is said to "migrate" if it is executing on (or is assigned to) a first computer system, and it's execution/assignment is moved to a second computer system.

Each virtual machine 16A–16E may have an associated load. The "load" of a virtual machine may be a value that represents the amount of computer system resources consumed by the virtual machine during execution. For example, the load may include a measure of the amount of CPU time used by the virtual machine. The load may include a measure of the amount of I/O activity. The load may include a measure of the amount of physical memory (e.g. in the storage 24) that is occupied by the virtual machine. The load may include the amount of paging caused by the virtual machine. The load may include the amount of communication generated by the virtual machine (e.g. through the virtual I/O devices that are used to communicate, such as modems, NICs, etc.). The load may include any combination of the above factors (e.g. a weighted sum of the factors). The load on a computer system 10A–10N may be the sum of the loads of the virtual machines executing on that computer system. If one or more of the computer systems 10A–10N have a higher load than other computer systems 10A–10N, then more efficient execution may be achievable by migrating one or more virtual machines from highly loaded computer systems to lower loaded computer systems.

The VM migration code may implement any migration scheme to load-balance between the computer systems 10A–10N. For example, a random scheme may be used in which the VM migration code executing on a computer system 10A–10N randomly selects another computer system 10A–10N with which to compare loads. If the other computer system 10A–10N has a lower load, the VM migration code may migrate a virtual machine to the other computer system. The VM migration code on each computer system 10A–10N may be activated periodically, and may randomly select another computer system with which to compare loads and to potentially migrate a virtual machine. Over time, the periodic random selecting by each computer system may lead to relative balance in the loads on the computer systems. Additionally, if loads change during use, additional migrations may lead to balancing the changed load.

Other migration schemes may also be used in other embodiments. For example, a sender-initiated scheme may be used in which the VM migration code is activated on a given computer system if that computer system's load exceeds a desired load. The VM migration code may select a less-loaded computer system or systems and migrate a virtual machine or machines to the less-loaded computer system. A receiver-initiated policy may be used in which the VM migration code is activated on a given computer system if that computer system's load decreases below a desired load. The VM migration code may select a more highly-loaded computer system or systems, which may migrate one or more virtual machines to the less-loaded computer system. A combination of the sender-initiated and receiver-initiated policies may be used to form a symmetric policy. Furthermore, combinations of the sender-initiated and/or receiver-initiated policies with the random policy may be used.

In one embodiment, migrating a virtual machine from one computer system to another may include removing the entry corresponding to the virtual machine from the VM schedule in the VM kernel on the computer system on which the virtual machine is currently executing (the "source computer system") and adding the entry to the VM schedule in the VM kernel on the computer system to which the virtual machine is migrating (the "target computer system"). The schedule entry may include an identifier that locates the virtual machine state (e.g. the identifier may include the location of the corresponding VM image 36A–36E on the shared storage 14 and the location of any state not in the VM image 36A–36E). In some embodiments, if the source computer system has virtual machine state that is not reflected in the VM image, the source computer system may transfer that state to the target computer system as part of the migration. Exemplary state transmitted by the source computer system may include various memory pages that are modified with respect to the VM image. In other embodiments, the state not reflected in the VM image may be transferred upon use by the virtual machine when executing on the target computer system (e.g. by experiencing page faults and fetching the corresponding pages from the source computer system). Alternatively, the migrating virtual machine may be suspended, similar to the operation of the suspend command described below. That is, the state of the virtual machine may be written to the VM image by the source computer system. Thus, an identifier locating the VM image may be sufficient to locate the virtual machine state for such an embodiment. Any mechanism for transferring virtual machine state between the source computer system and the target computer system may be used.

Once the virtual machine has migrated from the source computer system to the target computer system, the virtual machine may execute on the target computer system independent of the source computer system, even if the source computer system is the computer system on which the virtual machine was launched. A virtual machine may be "launched" on a particular computer system if its initial execution occurs on that computer system. For example, there may be no "stub" on the source computer system. The I/O activity in the virtual machine occurs on the virtual storage and I/O 34, which is virtualized and moved to the target computer system as part of the virtual machine. Thus, I/O activity in the virtual machine may correctly occur when the virtual machine is executing on the target computer system (either using I/O devices in the target computer system, or using I/O devices shared by the cluster, such as the shared storage device 14).

In one embodiment, the time of day from the source computer system may be transferred to the target computer system when a virtual machine is migrated. The virtual machine may have a virtual time of day attribute (which converts the time of day from the computer system on which the virtual machine is executing to the time of day of the virtual machine in the form of a constant to be added to the time returned by the computer system upon request by the virtual machine). The difference in time of day between the source computer system and the target computer system may be calculated by the target computer system when the migration is received, and the target computer system may modify the virtual time of day attribute to account for the difference. Subsequently, the time of day may be accurately reflected in the virtual machine and no additional adjustments may be necessary until another migration of the virtual machine occurs.

If there are processes which share memory segments, these processes may be included in the same virtual machine. Thus, migration of virtual machines may not be impacted by the sharing of memory segments. The set of processes and any shared memory segments are automatically migrated as part of the virtual machine that includes the processes. No restrictions on the number of shared memory segments, the processes which share the memory segments, etc. may be required.

The VM kernels 18A–18N communicate with each other to exchange load information and to migrate virtual machines. Such communication may be performed over the network 12, the shared storage 14, or a combination thereof.

Alternatively, a low latency protocol may be developed between the VM kernels 18A–18N, which may use the fastest connection between the computer systems 10A–10N.

In one embodiment, the VM kernel may support a command to suspend the virtual machine. In response to the command, the VM kernel may write an image of the virtual machine to the shared storage device 14, thus capturing the current state of the executing application. For example, the VM images 36A–36E on the shared storage device 14 may each correspond to respective virtual machines 16A–16E. The image may include one or more files written in response to the suspend command, capturing the state of the virtual machine that was in memory in the computer system, as well as the files stored on the shared storage device 14 that represent the virtual disks included in the virtual machine. The state may include not only files written by the application, but uncommitted changes to files which may still be in the memory within the virtual machine, the state of the hardware (including the virtual CPU 32, the memory in the virtual machine, etc.) within the virtual machine, etc. Thus, the image may be a snapshot of the state of the executing application.

A suspended virtual machine may be resumed using a resume command supported by the VM kernel. In response to the resume command, the VM kernel may read the image of the suspended virtual machine from disk and may activate the virtual machine in the computer system.

In one embodiment, each disk storage in the virtual machine (e.g. disk storages within the virtual storage 34) may be mapped to a file on the shared storage device 14, a file on any other storage device accessible to the computer systems 10A–10N, or directly to any such storage device. Each virtual I/O device may be mapped to a corresponding I/O device in the underlying hardware (e.g. the I/O circuitry 26) or may be emulated in software if no corresponding I/O device is included in the I/O circuitry 26.

The network 12 may comprise any network technology in various embodiments. The network 12 may be a local area network, wide area network, intranet network, Internet network, wireless network, or any other type of network. The network 12 may be designed to be continuously available (although network outages may occur), or may be intermittent (e.g. a modem connection made between a computer system in a user's home and a computer system in a user's workplace). Any network protocol may be used. For example, the network 12 may be an Ethernet network. Alternatively, the network may be a token ring network, etc. Additionally, the network 12 may comprise shared storage or shared memory for communicating between the computer systems, in some embodiments.

The shared storage device 14 may be any type of storage device to which the computer systems 10A–10N may be coupled. For example, the shared storage device 14 may comprise one or more small computer system interface (SCSI) drives attached to a SCSI bus shared by the computer systems 10A–10N. Alternatively, the shared storage device 14 may couple to the network 12 (e.g. network attached storage (NAS) or storage area network (SAN) technologies may be used). The shared storage device may also comprise memory. Generally, the shared storage device 14 may be any device capable of storing data.

Figure 2:
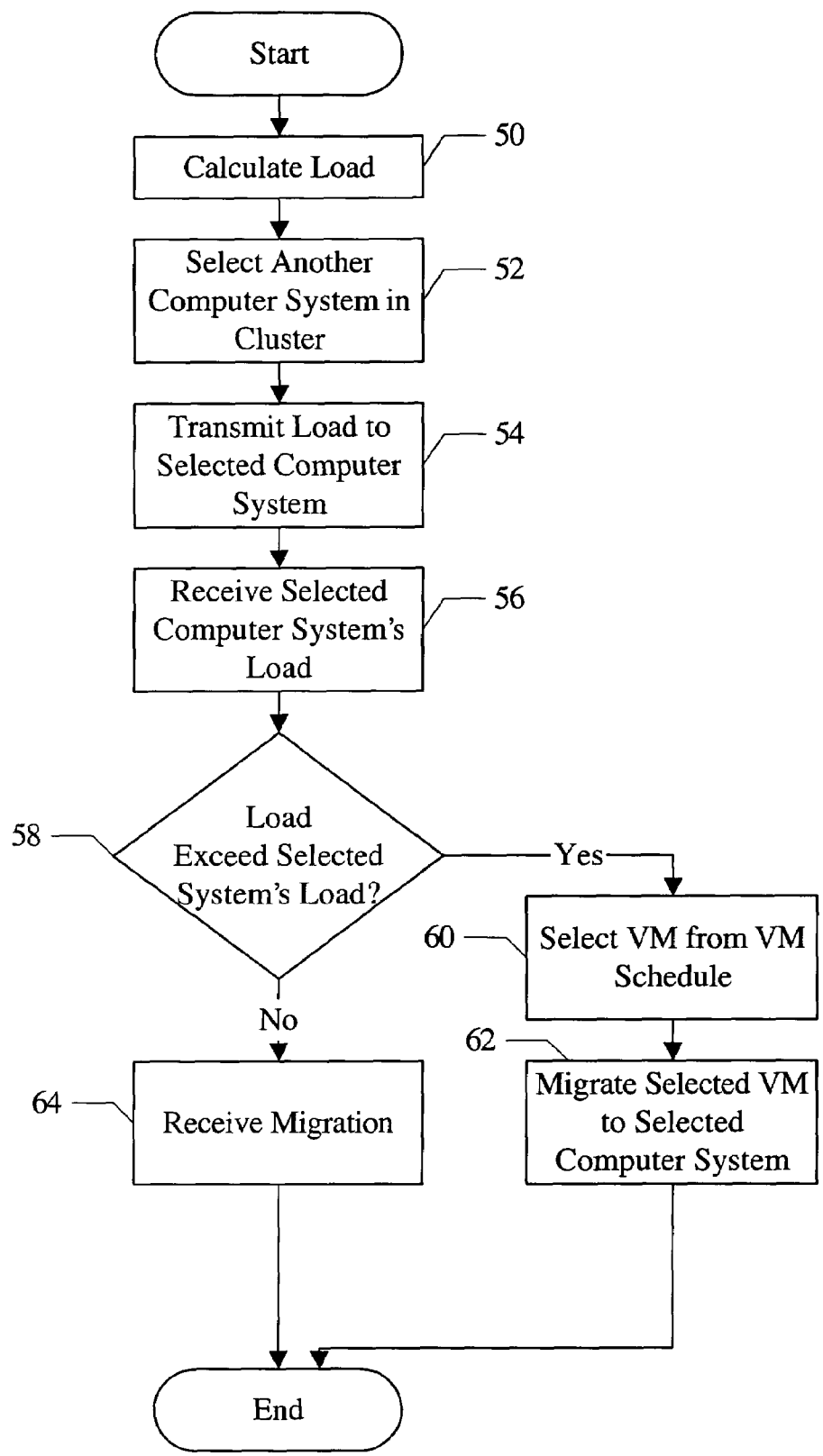
FIG. 2 is a flowchart illustrating operation of one embodiment of virtual machine migration code shown in FIG. 1 on a computer system selecting another computer system with which to exchange load information.

Turning now to FIG. 2, a flowchart illustrating operation of one embodiment of the VM migration code 38A (and similar code on other computer systems shown in FIG. 1) on a computer system selecting another computer system with which to exchange load information is shown. The computer system on which the VM migration code is executing as shown in FIG. 2 is referred to below as the "requesting" computer system, and the computer system selected to exchanged load information is referred to as the "selected" computer system. That is, the VM migration code 38A may operate according to the flowchart of FIG. 2 when activated on a requesting computer system to attempt load balancing. As mentioned above, each computer system may periodically activate the VM migration code to attempt load balancing with another computer system. Alternatively, in sender-initiated schemes, the VM migration code may be activated when the requesting computer system has a load that exceeds a desired threshold load. In receiver-initiated schemes, the VM migration code may be activated when the requesting computer system has a load that falls below a desired threshold load. In symmetric schemes, the VM migration code may be activated in either of the sender-initiated or receiver-initiated cases. While the blocks shown are illustrated in a particular order for ease of understanding, other orders may be used. Each block may represent one or more instructions in the VM migration code that, when executed, implement the operation described for that block.

The VM migration code calculates the load on the requesting computer system (block 50). In other embodiments, the load may be calculated by other software and recorded for used by the VM migration code. For example, other software within the VM kernel may be used to calculate the load. In yet another example, other software such as a user-level program executing on the requesting computer system or another computer system may calculate the load (e.g. performance monitoring/management software such as the Precise $I^3$ product mentioned below). Still further, the load may be set manually (e.g. by an administrator, to cause a virtual machine to migrate away from the requesting computer system). The load may be calculated by summing the loads of each virtual machine. The load of each virtual machine may be calculated according to the resources that it uses. For example, in one embodiment, the load of a given virtual machine may be calculated using the formula shown in FIG. 4.

The VM migration code selects another computer system in the cluster with which to attempt load balancing (block 52). In some embodiments, the selection may be random. Alternatively, a list of computer systems may be maintained and the VM migration code may select the computer system that is next in the list. The VM migration code transmits the load of the requesting computer system to the selected computer system (block 54). The VM migration code in the selected computer system may be activated in response to receiving the load from the VM migration code in the requesting computer system, and the VM migration code in the selected computer system may transmit the selected computer system's load to the requesting computer system. The VM migration code may receive the selected computer system's load (block 56).

The VM migration code compares the requesting computer system's load to the selected computer system's load (decision block 58) to determine if the requesting computer system's load exceeds the selected computer system's load. The comparison may be a simple numerical comparison (in which one load exceeds the other load if it is numerically greater than the other load). Alternatively, the comparison may include a threshold factor, and one load may be judged to exceed another load if it exceeds the other load by at least the threshold factor. The threshold factor may be fixed or programmable, and may be selected to reduce the amount of migration if loads are approximately the same between two computer systems. As used herein, a load "exceeding"

another load includes either the simple numerical comparison or the comparison including the threshold factor.

If the requesting computer system's load exceeds the selected computer system's load (decision block 58, "yes" leg), the VM migration code selects a virtual machine from the VM schedule (block 60). The VM migration code may delete the selected VM's entry from the schedule. The VM migration code migrates the selected virtual machine to the selected computer system (block 62). For example, in one embodiment, the VM migration code may transmit the schedule entry of the selected virtual machine to the selected computer system (which inserts the schedule entry into its VM schedule). As mentioned above, in some embodiments, additional virtual machine state (e.g. memory pages corresponding to the virtual machine that are not reflected in the VM image corresponding to the virtual machine) may also be transmitted, and the time of day of the requesting computer system may be transmitted.

Figure 6:
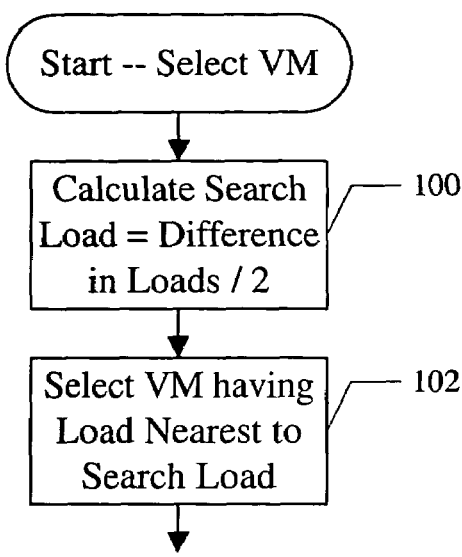
FIG. 6 is a flowchart illustrating one embodiment of a select virtual machine block shown in FIGS. 2 and 3.

The virtual machine to be migrated via blocks 60 and 62 may be selected in any desired fashion. For example, the virtual machine that is creating the largest actual load may be selected. That is, the virtual machine that is consuming the most computer system resources (as measured by the load) may be selected. In some embodiments, a user or administrator may program a desired load for a given virtual machine (and the VM kernel may attempt to schedule the given virtual machine to achieve the desired load). The virtual machine to be migrated may be selected based on the programmed load. In other embodiments, the virtual machine to be migrated may be selected as illustrated in FIGS. 6 and/or 7. It is noted that more than one virtual machine may be migrated (e.g. if the difference in loads is large, migrating more than one virtual machine may be more likely to balance the load).

On the other hand, if the requesting computer system's load does not exceed the selected computer system's load (decision block 58, "no" leg), the selected computer system may migrate a virtual machine to the requesting computer system. In such an embodiment, the VM migration code may receive the migration (block 64). For example in one embodiment, the VM migration code may receive the schedule entry of the migrating virtual machine from the selected computer system. Optionally, additional virtual machine state may be received, as mentioned above, and the time of day may be received. The virtual time of day constant in the migrated virtual machine may be updated to reflect the difference in the time of day between the requesting computer system and the selected computer system. The VM migration code may insert the schedule entry into the VM schedule.

In other embodiments, no operation may occur if the requesting computer system's load does not exceed the selected computer system's load (e.g. block 64 may be eliminated). Instead, a later activation of the VM migration code on the selected computer system may lead to the migration of a virtual machine to the requesting computer system (or to another computer system randomly selected by the VM migration code).

Figure 3:
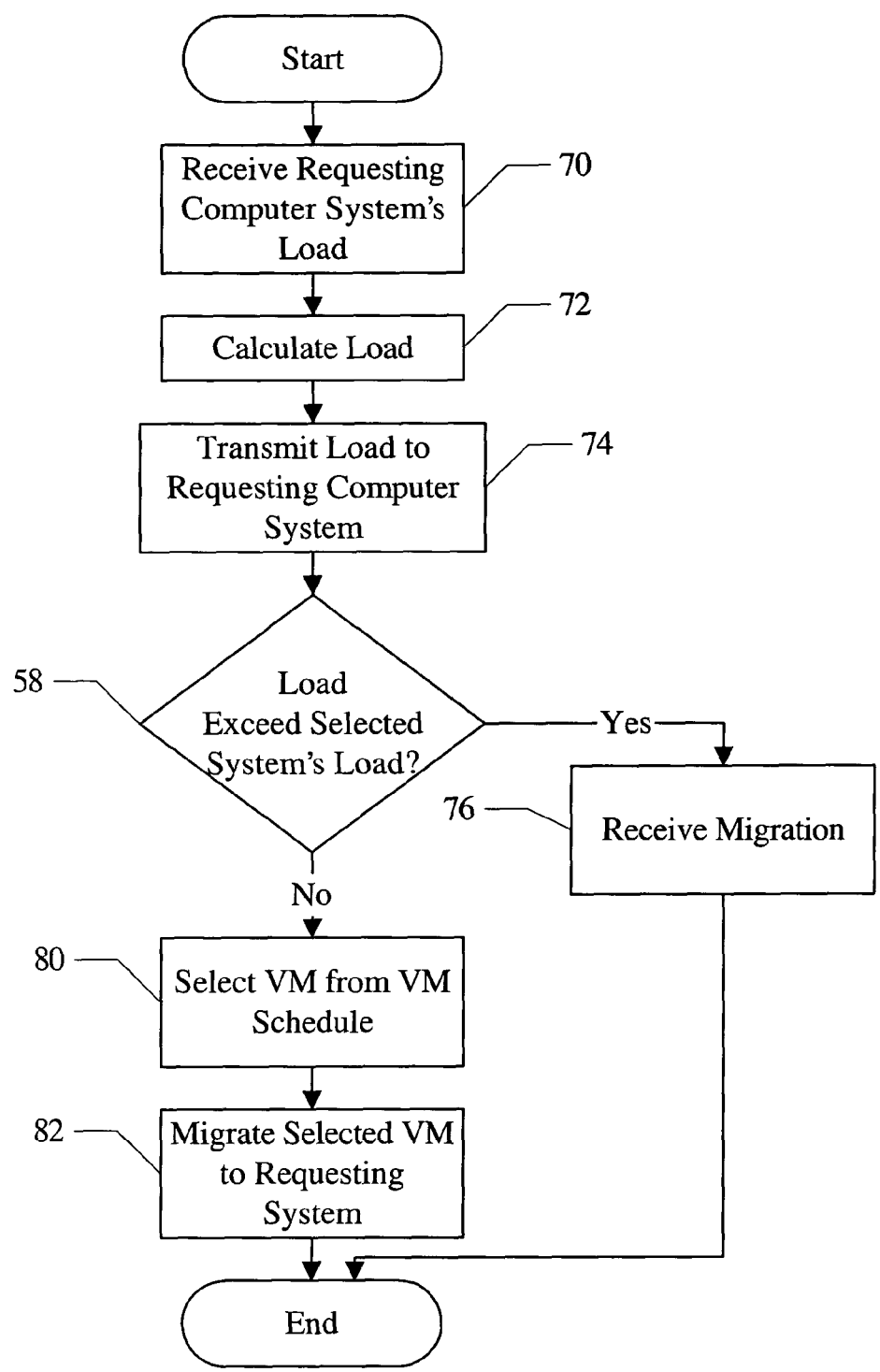
FIG. 3 is a flowchart illustrating operation of one of virtual machine migration code shown in FIG. 1 on a computer system receiving a communication to exchange load information.

Turning next to FIG. 3, a flowchart illustrating operation of one embodiment of the VM migration code 38A (and similar code on other computer systems shown in FIG. 1) on a selected computer system (as referred to above with regard to FIG. 2) is shown. That is, the flowchart of FIG. 3 may illustrate execution of the VM migration code in response to receiving the load transmitted by a requesting computer system. While the blocks shown are illustrated in a particular order for ease of understanding, other orders may be used. Each block may represent one or more instructions in the VM migration code that, when executed, implement the operation described for that block.

The VM migration code receives the requesting computer system's load (block 70). Similar to block 50 in the flowchart of FIG. 2, the VM migration code may calculate the selected computer system's load (or other software in the VM kernel may calculate the load, and the VM migration code may read the load) (block 72). The VM migration code transmits the selected computer system's load to the requesting computer system (block 74).

Similar to the VM migration code in the requesting computer system, the VM migration code in the selected computer system determines if the requesting computer system's load exceeds the selected computer system's load (decision block 58). If the requesting computer system's load exceeds the selected computer system's load (decision block 58, "yes" leg), the VM migration code receives the migration from the requesting computer system (block 76). For example, in one embodiment, the VM migration code may receive the schedule entry corresponding to the virtual machine being migrated from the requesting computer system and may insert the schedule entry in the VM schedule in the selected computer system. Optionally, additional virtual machine state may be received, as mentioned above, and the virtual time of day adjustment to reflect differences in the time of day between the requesting computer system and the selected computer system may be performed.

On the other hand, if the requesting computer system's load does not exceed the selected computer system's load (decision block 58, "no" leg), the VM migration code may select a virtual machine to migrate (block 80). The VM migration code may remove the corresponding entry from the VM schedule in the selected computer system. The VM migration code migrates the selected virtual machine to the requesting computer system (block 82). For example, in one embodiment, the VM migration code may transmit the schedule entry to the requesting computer system. Optionally, additional virtual machine state and the selected computer system's time of day may be transmitted. In other embodiments, no operation may occur if the requesting computer system's load does not exceed the selected computer system's load (e.g. blocks 80 and 82 may be eliminated).

Figures 4, 5:
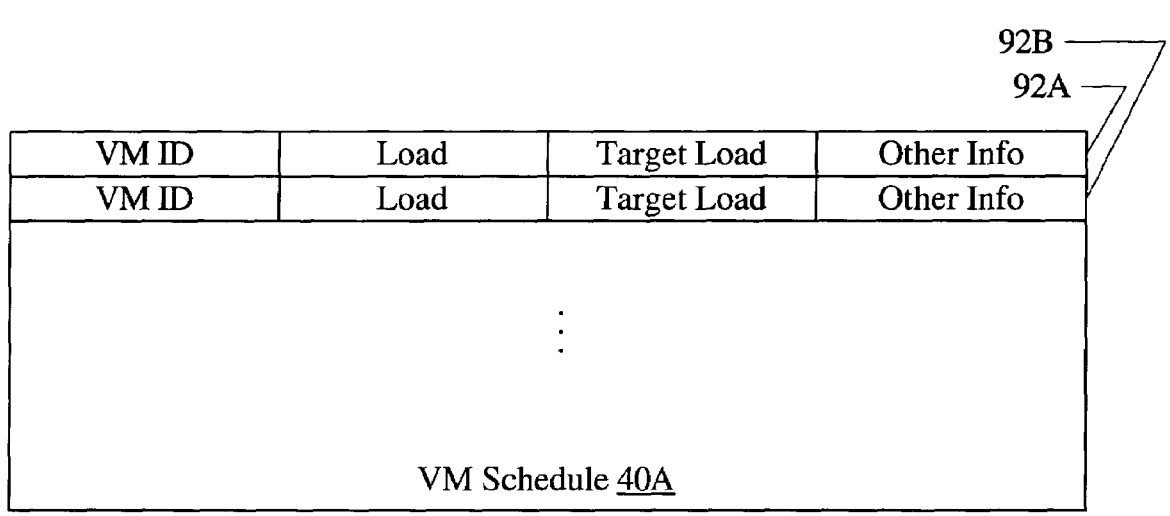
FIG. 4 is one embodiment of a load calculation formula.
FIG. 5 is a block diagram of one embodiment of a virtual machine schedule shown in FIG. 1.

Turning now to FIG. 4, a block diagram illustrating one embodiment of a formula 90 for the load of a virtual machine is shown. In the illustrated embodiment, the amount of CPU time used by the virtual machine (CPUTime in FIG. 4), the amount of I/O activity (I/O Activity in FIG. 4) generated by the virtual machine, and the amount of memory consumed by the virtual machine (Memory Pages in FIG. 4) are included in the load calculation. Other embodiments may use any subset of the above factors, the above factors (or a subset) and additional factors, or other factors, as desired. Generally, each factor may be a measurement that represents the underlying activity. For example, the CPU time may represent the amount of time in a preceding fixed period that the virtual machine executed on the CPU, a percentage of the total execution time that has been used for the virtual machine, or any other measurement. I/O activity may be measured in terms of a number of I/O operations per unit of time or in a preceding fixed period, an amount of I/O data transferred, an amount of time spent performing I/O operations, or any other measurement. Memory consumed may be measured in terms of a number of pages allocated to the virtual machine, amount of paging occurring during execution of the virtual machine, or any other measurement.

Each of the factors may be assigned a weight for the load calculation. The weight for the CPU time ($W_{CPU}$), the weight for the I/O activity ($W_{I/O}$), and the weight for the memory ($W_{Mem}$) may be varied as desired. In some embodiments, the same set of weights (e.g. $W_{CPU}$, $W_{I/O}$, and $W_{Mem}$) may be used on each computer system 10A–10N to distribute the virtual machine load as evenly as possible across the computer systems. Such a strategy may be used, e.g., if the computer systems 10A–10N are configured with similar resources (processors, storage, I/O devices, etc.).

Alternatively, one or more of the weights may be varied from computer system to computer system. For example, if a given computer system 10A–10N has a higher performance I/O subsystem than one or more other computer systems 10A–10N, the weight $W_{I/O}$ for the given computer system may be smaller than the weight $W_{I/O}$ on other computer systems to reflect the ability of the given computer system to efficiently handle more I/O activity than the other computer systems. Similarly, the $W_{Mem}$ weight on a computer system that has a larger capacity or lower latency memory system than other computer systems may be smaller than the $W_{Mem}$ weight on the other computer system. The $W_{CPU}$ weight on a computer system having an higher performance CPU (or more CPUs) than other computer systems may be smaller than the $W_{CPU}$ weight on the other computer systems. In another example, if a computer system is more "expensive", then other computer systems the weights on the expensive computer system may be increased relative to the weights on the other computer systems, so that the expensive computer system appears to be more heavily loaded when executing a given number of virtual machines that the other computer systems. The other computer systems may thus execute a larger percentage of the overall load. A computer system may be "expensive", for example, if costs to execute on the computer system are high (e.g. if the user is charged for use of the computer system) or if the computer system is needed for other purposes and diverting resources to execute virtual machines impacts those other purposes.

In some embodiments, an application executing in a virtual machine may be monitoring the performance of other applications. Such performance monitoring software typically monitors various performance metrics of the executing application and attempts to tune the system to execute the application with higher performance. For example, if a database program such as Oracle is being monitored, the performance monitoring software may detect that frequent access is being made to data stored on a relatively slow disk, and may attempt to stripe the data onto multiple disks or move the data to a higher performance disk. Such performance monitoring software, if executing on the virtual machine, would reconfigure the virtual hardware (which may have little to no effect on the underlying hardware). Instead, performance monitoring software may provide hints to improve performance of the virtual machine to the VM kernel. The VM kernel may modify the load calculation (e.g. the weights) to cause a migration to another computer system where the virtual machine may achieve higher performance (e.g. due to less competition from other virtual machines, higher performance I/O devices in the computer system that is migrated to, etc.). An example of performance monitoring software may be the Precise I³ product available from VERITAS Software Corporation (Mountain View, Calif.).

Turning now to FIG. 5, a block diagram of one embodiment of the VM schedule 40A is shown in greater detail. VM schedules in other VM kernels 18B–18N may be similar. In the embodiment of FIG. 5, the VM schedule 40A includes a set of entries (e.g. entries 92A and 92B are shown in FIG. 5). Each entry includes a virtual machine identifier field (VM ID), a load field (Load), a target load field (Target Load), and other information (Other Info).

The VM ID field may store an identifier or identifiers that may be used to locate the virtual machine state. For example, the VM ID field may identify the corresponding VM image 36A–36E on the shared storage 14 (e.g. via a path name and file name or names).

The Load field may store the load calculated for the virtual machine (e.g. according to the formula 90 or any other load measurement). In other embodiments, the load may be calculated and stored separate from the VM schedule 40A. As mentioned above, the load may be calculated by the VM kernel, by other software such as performance monitoring/management software, manually set by an administrator, etc. The Target Load field may be programmable (e.g. by an administrator or user of the cluster) with a target load for the virtual machine. That is, the target load may be used by the VM kernel to schedule the virtual machine frequently enough to achieve the desired load. The target loads may be used to cause certain virtual machines to be favored in scheduling over other virtual machines. The Target Load field may be optional, and may not be included in some embodiments.

The Other Info field, an optional field that may not be included in other embodiments, may be used to store any other desired information. For example, the Other Info field may store information for scheduling the virtual machine, for restoring its state for execution when it is scheduled, etc.

Turning now to FIG. 6, a flowchart is shown illustrating one embodiment of selecting a virtual machine for migration (e.g. blocks 60 and 80 shown in FIGS. 2 and 3, respectively). Each block may represent one or more instructions in the VM migration code that, when executed, implement the operation described for that block.

The VM migration code may calculate a search load equal to the difference between the requesting computer system's load and the selected computer system's load divided by 2 (block 100). The VM migration code may select a virtual machine having a load nearest to the search load (block 102). The virtual machine's load may be greater than or less than the search load, but may be numerically closer to the search load than the other virtual machines executing on the requesting computer system.

By selecting a virtual machine having a load that is close to ½ of the difference between the requesting computer system's load and the selected computer system's load, the VM migration code may approximate evening the load between the requesting computer system and the selected computer system. For example, if the requesting computer system's load were 120 and the selected computer system's load were 80, and the virtual machine migrating from the requesting computer system to the selected computer system were 20, then the requesting computer system's load after the migration would reduce from 120 to 100 and the selected computer system's load would increase from 80 to 100.

As mentioned above, in some embodiments, the weights assigned to the various load factors included in the load calculation (e.g. CPU time, memory usage, I/O activity, etc.) may be different on different computer systems. In such embodiments, the requesting computer system and the selected computer system may exchange the load factor values for various virtual machines that are candidates for migration. Each computer system may calculate the load caused (or that would be caused) by each of the virtual machines on that computer system, and the computer systems may exchange the calculated loads. If a virtual machine is migrated from the requesting computer system to the selected computer system, for example, the load on the requesting computer system may be expected to decrease by the load calculated for the migrated virtual machine on the requesting computer system and the load on the selected computer system may be expected to increase by the load calculated for the migrated virtual machine on the selected computer system. If the load for the virtual machine on the selected computer system is less than the load on the requesting computer system, then a net gain may be experienced by migrating the virtual machine from the requesting computer system to the selected computer system. Generally, a virtual machine which, by its migration, comes the closest to balancing the total load on the requesting computer system and the selected computer system may be selected.

Figure 7:
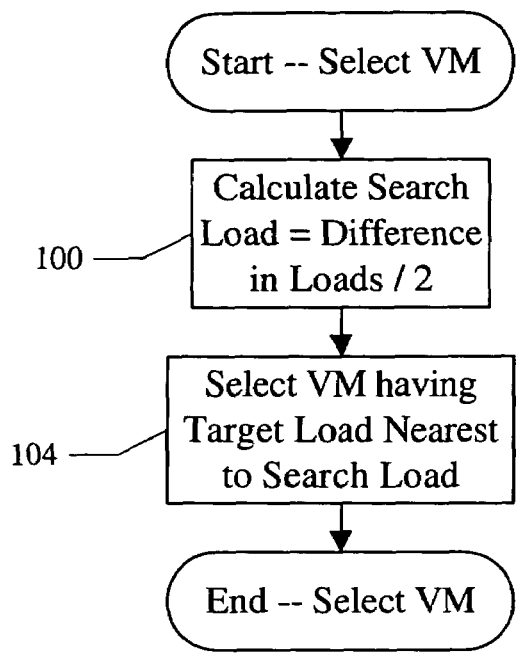
FIG. 7 is a flowchart illustrating a second embodiment of a select virtual machine block shown in FIGS. 2 and 3.

The embodiment of FIG. 6 uses the actual loads experienced on the computer system for each virtual machine (e.g. calculated from the formula 90 or other such formulas). In another embodiment, if target loads are implemented in the VM schedule, the target loads may be used to select the virtual machine to migrate. FIG. 7 is a flowchart illustrating an exemplary embodiment using the target loads. Each block may represent one or more instructions in the VM migration code that, when executed, implement the operation described for that block.

Similar to the embodiment of FIG. 6, the VM migration code may calculate a search load equal to the difference between the requesting computer system's load and the selected computer system's load divided by 2 (block 100). The VM migration code may select a virtual machine having a target load nearest to the search load (block 104).

Figure 8:
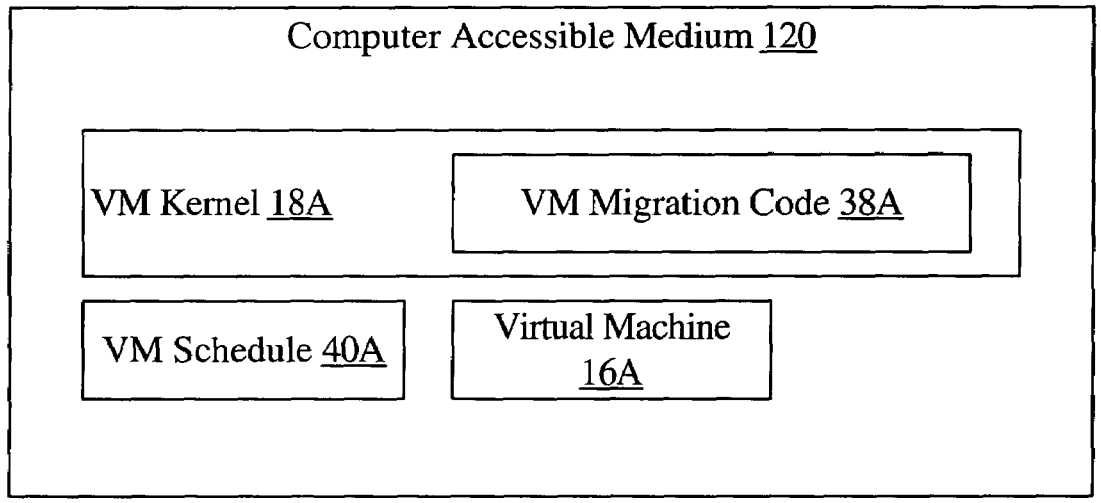
FIG. 8 is a block diagram of one embodiment of a computer accessible medium.

Turning now to FIG. 8, a block diagram of a computer accessible medium 120 is shown. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link. The computer accessible medium 120 in FIG. 8 may store one or more of the VM kernel 18A (including the VM migration code 38A), the VM schedule 40A, and the virtual machine 16A. In other embodiments, the computer accessible medium 120 may further store other virtual machines, virtual machine images, etc.).

In some embodiments, the shared storage 14 may comprise the computer accessible medium. In other embodiments, storage included in one or more of the computer systems may comprise the computer accessible medium. In still other embodiments, a combination of the shared storage and storage included in one or more of the computer systems may comprise the computer accessible medium.

Numerous variations and modifications will become apparent to those skilled in the art once the above disclosure is fully appreciated. It is intended that the following claims be interpreted to embrace all such variations and modifications.

What is claimed is:

1. A cluster comprising a plurality of computer systems, wherein each of the plurality of computer systems is configured to execute one or more virtual machines, each of the plurality of computer systems comprising hardware and a plurality of instructions that, when executed on the hardware, detects that a first load of a first computer system of the plurality of computer systems exceeds a second load of a second computer system of the plurality of computer systems and migrates at least a first virtual machine executing on the first computer system to the second computer system responsive to detecting that the first load exceeds the second load, and wherein the first virtual machine has a corresponding load that is nearest, among loads of the virtual machines executing on the first computer system, to ½ the difference between the first load and the second load.

2. The cluster as recited in claim 1 wherein the first virtual machine executes on the second computer system independent of the first computer system, even if the first virtual machine was initially launched on the first computer system.

3. The cluster as recited in claim 1 wherein the plurality of instructions, when executed on the first computer system, select the second computer system to compare loads.

4. The cluster as recited in claim 3 wherein the plurality of instructions, when executed on the first computer system, randomly select the second computer system from the plurality of computer systems.

5. The cluster as recited in claim 1 wherein the corresponding load of the first virtual machine represents the actual load experienced in executing the first virtual machine on the first computer system.

6. The cluster as recited in claim 1 wherein the corresponding load of the first virtual machine represents a target load programmed for the first virtual machine in the first computer system.

7. The cluster as recited in claim 1 wherein the first virtual machine has a first corresponding load on the first computer system and a second corresponding load on the second computer system, and wherein the first corresponding load differs from the second corresponding load, wherein the first computer system is configured to transmit one or more load factors to the second computer system, and wherein the second computer system is configured to calculate the second corresponding load from the one or more load factors, and wherein the first computer system and the second computer system are configured to exchange the first corresponding load and the second corresponding load to select the first virtual machine for migration.

8. The cluster as recited in claim 1 wherein the corresponding load is calculated as a weighted combination of measurements of usage of two or more resources of the first computer system.

9. The cluster as recited in claim 8 wherein the measurements of usage include an amount of time that the first virtual machine is executing in a central processing unit of the first computer system.

10. The cluster as recited in claim 8 wherein the measurements of usage include an amount of input/output activity generated by the first virtual machine during execution.

11. The cluster as recited in claim 8 wherein the measurements of usage include an amount of memory occupied by the first virtual machine.

12. The cluster as recited in claim 1 wherein each of the plurality of computer systems include a schedule having a plurality of entries, each entry corresponding to a virtual machine to be executed on the respective one of the plurality of computer systems, and wherein migrating the first virtual machine comprises deleting the entry corresponding to the first virtual machine in the schedule of the first computer system and inserting the entry corresponding to the first virtual machine in the schedule of the second computer system.

13. A method comprising:
scheduling one or more virtual machines for execution on hardware comprising a first computer system of a plurality of computer systems;
the first computer system detecting that the first computer system has a first load that exceeds a second load of a second computer system of the plurality of computer systems; and
the first computer system migrating at least a first virtual machine executing on the first computer system to a second computer system of the plurality of computer systems responsive to the detecting, and wherein the first virtual machine has a corresponding load that is nearest, among the virtual machines executing on the first computer system, to ½ the difference between the first load and the second load.

14. The method as recited in claim 13 further comprising executing the first virtual machine on the second computer system independent of the first computer system, even if the first virtual machine was initially launched on the first computer system.

15. The method as recited in claim 13 further comprising:
selecting the second computer system to compare loads; and
selecting the first virtual machine to migrate to the second computer system responsive to the first load exceeding the second load.

16. The method as recited in claim 15 wherein selecting the second computer system is random.

17. The method as recited in claim 16 further comprising each of the plurality of computer systems periodically randomly selecting another one of the plurality of computer systems to compare loads and to potentially migrate virtual machines.

18. The method as recited in claim 13 wherein the first virtual machine has a first corresponding load on the first computer system and a second corresponding load on the second computer system, and wherein the first corresponding load differs from the second corresponding load, the method further comprising:
the first computer system transmitting one or more load factors to the second computer system;
the second computer system calculating the second corresponding load from the one or more load factors; and
the first computer system and the second computer system exchanging the first corresponding load and the second corresponding load to select the first virtual machine for migration.

19. The method as recited in claim 13 further comprising calculating the corresponding load as a weighted combination of measurements of usage of two or more resources of the first computer system.

20. The method as recited in claim 13 wherein each of the plurality of computer systems include a schedule having a plurality of entries, each entry corresponding to a virtual machine to be executed on the respective one of the plurality of computer systems, and wherein migrating the first virtual machine comprises:
deleting the entry corresponding to the first virtual machine in the schedule of the first computer system; and
inserting the entry corresponding to the first virtual machine in the schedule of the second computer system.

21. The computer accessible medium as recited in claim 20 wherein the first virtual machine executes on the second computer system independent of the first computer system during use, even if the first virtual machine was initially launched on the first computer system.

22. A computer accessible medium encoded with a plurality of instructions that, when executed on a first computer system:
select a first virtual machine from one or more virtual machines to be scheduled for execution on the first computer system responsive to a first load of the first computer system exceeding a second load of a second computer system of a plurality of computer systems including the first computer system, and wherein the first virtual machine has a corresponding load that is approximately ½ the difference between the first load and the second load; and
migrate the first virtual machine to the second computer system to be executed on the second computer system.

23. The computer accessible medium as recited in claim 22 wherein the plurality of instructions, when executed, schedule the one or more virtual machines for execution on hardware comprising the first computer system.

24. The computer accessible medium as recited in claim 22 wherein the plurality of instructions, when executed, select the second computer system to compare loads.

25. The computer accessible medium as recited in claim 24 wherein the second computer system is randomly selected from the plurality of computer systems.

26. The computer accessible medium as recited in claim 22 wherein the corresponding load of the first virtual machine represents the actual load experienced in executing the first virtual machine on the first computer system.

27. The computer accessible medium as recited in claim 22 wherein the corresponding load of the first virtual machine represents a target load programmed for the first virtual machine in the first computer system.

28. The computer accessible medium as recited in claim 22 wherein the first virtual machine has a first corresponding load on the first computer system and a second corresponding load on the second computer system, and wherein the first corresponding load differs from the second corresponding load, and wherein the plurality of instructions, when executed:
transmit one or more load factors to the second computer system, wherein the second computer system is configured to calculate the second corresponding load from the one or more load factors; and
exchanges the first corresponding load and the second corresponding load with the second computer system to select the first virtual machine for migration.

29. The computer accessible medium as recited in claim 22 wherein the plurality of instructions, when executed, calculate the corresponding load as a weighted combination of measurements of usage of two or more resources of the first computer system.

30. The computer accessible medium as recited in claim 22 wherein each of the plurality of computer systems include a schedule having a plurality of entries, each entry corresponding to a virtual machine to be executed on the respective one of the plurality of computer systems, and wherein the plurality of instructions migrate the first virtual machine by:

deleting the entry corresponding to the first virtual machine in the schedule of the first computer system; and inserting the entry corresponding to the first virtual machine in the schedule of the second computer system.

31. The computer accessible medium as recited in claim 30 wherein the plurality of instructions, when executed, calculate the first load as a weighted combination of measurements of usage of two or more resources of the first computer system, and wherein the second load is calculated as a weighted combination of measurements, wherein the weights differ between the first and second computer systems.

32. A computer accessible medium encoded with a plurality of instructions that, when executed on a first computer system:

calculate a first load on the first computer system from one or more load factors, wherein the first load corresponds to a first virtual machine, and wherein the first virtual machine is one of one or more virtual machines to be scheduled for execution on the first computer system;

transmit the one or more load factors from the first computer system to a second computer system, wherein the second computer system is configured to calculate a second load on the second computer system from the one or more load factors, wherein the second load corresponds to the first virtual machine, and wherein the first load differs from the second load; and migrate the first virtual machine to the second computer system to be executed on the second computer system responsive to a first total load of the first computer system exceeding a second total load of the second computer system, and wherein the first virtual machine has a corresponding load that is nearest, among loads of the virtual machines executing on the first computer system, to $\frac{1}{2}$ the difference between the first total load and the second total load.

33. The computer accessible medium as recited in claim 32 wherein the first virtual machine executes on the second computer system independent of the first computer system during use, even if the first virtual machine was initially launched on the first computer system.

34. The computer accessible medium as recited in claim 32 wherein each of the plurality of computer systems include a schedule having a plurality of entries, each entry corresponding to a virtual machine to be executed on the respective one of the plurality of computer systems, and wherein the plurality of instructions migrate the first virtual machine by:

deleting the entry corresponding to the first virtual machine in the schedule of the first computer system; and inserting the entry corresponding to the first virtual machine in the schedule of the second computer system.

* * * * *